US008760874B2

(12) United States Patent
Casey (10) Patent No.: US 8,760,874 B2
(45) Date of Patent: Jun. 24, 2014

(54) ELECTRICAL BOX SAFETY REDESIGN

(76) Inventor: Daniel P. Casey, Seattle, WA (US)

( * ) Notice: Subject to any disclaimer, the term of this patent is extended or adjusted under 35 U.S.C. 154(b) by 251 days.

(21) Appl. No.: 13/350,331

(22) Filed: Jan. 13, 2012

(65) Prior Publication Data

US 2013/0058051 A1    Mar. 7, 2013

Related U.S. Application Data (60) Provisional application No. 61/575,956, filed on Sep. 1, 2011, provisional application No. 61/626,051, filed on Sep. 20, 2011.

(51) Int. Cl.
*H05K 5/00* (2006.01)
*H05K 7/00* (2006.01)

(52) U.S. Cl.
USPC ....... 361/730; 361/728; 361/729; 361/679.01

(58) Field of Classification Search
CPC ............. H01L 23/3107; H01L 23/367; H01L 23/3733; H01L 23/40; H01L 23/48; H01L 23/495; H01L 23/49827; H01L 23/49833; H01L 23/5385; H01L 23/5389; H01L 23/562; H01L 23/642; H01L 23/645; H01L 24/05; G05B 19/0426; G05B 2219/25314; G05B 2219/25323; H05K 1/144; H05K 3/284; H05K 1/141; H05K 7/1432; H05K 7/026; H05K 7/1425; H05K 7/1461; H05K 5/0017; H05K 7/00; H05K 9/0062; H05K 2201/10106; H05K 5/0217; H05K 7/1424; H05K 7/1435
USPC ................... 361/730, 729, 728, 679.01, 600; 439/535
See application file for complete search history.

(56) References Cited

U.S. PATENT DOCUMENTS

| | | | |
|---|---|---|---|
| 4,333,489 A | 6/1982 | Magill et al. | |
| 4,417,687 A | 11/1983 | Grant | |
| 4,993,970 A * | 2/1991 | Littrell | 439/535 |
| 5,117,122 A | 5/1992 | Hogarth et al. | |
| 5,458,311 A | 10/1995 | Holbrook | |
| 5,530,435 A | 6/1996 | Toms et al. | |
| 5,736,674 A * | 4/1998 | Gretz | 174/50 |
| 5,959,246 A * | 9/1999 | Gretz | 174/50 |
| 6,053,809 A | 4/2000 | Arceneaux | |
| 6,120,262 A | 9/2000 | McDonough et al. | |
| 6,630,800 B2 | 10/2003 | Weng | |
| 7,045,706 B1 | 5/2006 | Lincoln, III et al. | |
| 7,656,308 B2 | 2/2010 | Atkins | |
| 7,715,441 B2 | 5/2010 | Binder | |
| 7,982,434 B2 | 7/2011 | Kimball et al. | |
| 8,558,110 B1 * | 10/2013 | Shotey et al. | 174/53 |

(Continued)

*Primary Examiner* — Jenny L Wagner
*Assistant Examiner* — Ahmad D Barnes (57) ABSTRACT

An electrical control system for fixtures, devices and appliances that safety isolates a power source using the features of the safety block, and consolidates multiple control points to remotely activate a combination of fixtures, devices and appliances using the features of the control module, thereby promoting safety and facilitating energy conservation. The system has a safety block where a safety-block AC power supply connector on the rear attaches to a household alternating current (AC) power supply. The safety-block AC power supply connector passes through a cavity to the safety-block AC power transfer connector located on the front. The system also has a control module with a control-module user interface on the front. A control-module AC power connector connects to the control-module user interface and passes through the control-module cavity to connect to the safety-block AC power transfer connector located on the front of the safety block.

19 Claims, 5 Drawing Sheets

(56) References Cited

U.S. PATENT DOCUMENTS

| | | |
|---|---|---|
| 2001/0055947 A1 | 12/2001 | McCabe |
| 2006/0065510 A1 | 3/2006 | Kiko et al. |
| 2006/0190739 A1 | 8/2006 | Soffer |
| 2007/0195526 A1 | 8/2007 | Dowling et al. |
| 2007/0202794 A1 | 8/2007 | Antill |
| 2008/0258675 A1 | 10/2008 | Caldwell et al. |
| 2009/0195349 A1 | 8/2009 | Frader-Thompson et al. |
| 2009/0224423 A1* | 9/2009 | Vigorito et al. .......... 264/272.15 |
| 2010/0226100 A1* | 9/2010 | Johnson et al. ................ 361/730 |
| 2011/0053487 A1 | 3/2011 | Casey |

* cited by examiner

ELECTRICAL BOX SAFETY REDESIGN

CROSS REFERENCE

This application claims priority to U.S. provisional application Ser. No. 61/575,956 filed Sep. 1, 2011, and U.S. provisional application Ser. No. 61/262,051 filed Sep. 20, 2011, the specification of which is incorporated herein by reference in its entirety.

BACKGROUND OF THE INVENTION

Electricity and other forms of energy have been used in homes and businesses for more than one hundred years to bring illumination and environmental comfort to the occupants. Although the benefits of these features cannot be denied, the costs associated with their use can be significant or even burdensome at times. Fossil fuels are a limited natural resource that may be used by municipalities for generating electricity or used directly by the consumer for heating. Inefficient use of these natural resources creates a higher demand that directly affects a person's finances on a local level while affecting economies of countries on a global scale. The present invention teaches a safe method to isolate electricity while facilitating energy conservation with intelligent control.

SUMMARY

The present invention features an electrical control system for fixtures, devices and appliances that consolidates multiple control points, and safely isolates a typical household power source, for promoting safety and facilitating energy conservation.

In some embodiments, the system has a safety block where a safety-block AC power supply connector on the rear attaches to a household alternating current (AC) power supply. In some embodiments, the safety-block AC power supply connector passes through a cavity to the safety-block AC power transfer connector located on the front.

In some embodiments, the system has a control module with a control-module user interface on the front. In some embodiments, a control-module AC power connector connects to the control-module user interface and passes through the control-module cavity to connect to the safety-block AC power transfer connector located on the front of the safety block.

In some embodiments, the electrical control system for fixtures, devices and appliances safety isolates a typical household power source using the features of the safety block, and consolidates multiple control points to remotely activate a combination of fixtures, devices and appliances using the features of the control module, thereby promoting safety and facilitating energy conservation.

In some embodiments, a series of inventions work together to promote safety and facilitate energy conservation, for example: U.S. Pat. No. 8,089,769, Multifunctional/Modular Smoke Alarm Device; U.S. patent application Ser. No. 12/551,214, Filed Aug. 31, 2009, Vent Cover And Louver Assembly; U.S. Patent Application No. 61/575,956, Filed Sep. 1, 2011, Rechargeable battery for "New Power Outlet Model" and "New Wireless Light Switch Model" to work with "New Emergency Night Light Cover".

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

DESCRIPTION OF PREFERRED EMBODIMENTS

Following is a list of elements corresponding to a particular element referred to herein:
- 100 Control system
- 110 Mounting surface
- 120 Electrical box
- 130 Alternating current (AC) power supply
- 200 Safety block
- 202 Safety-block rear
- 204 Safety-block front
- 206 Safety-block cavity
- 210 Safety-block alternating current (AC) power supply connector
- 220 Safety-block alternating current (AC) power transfer connector
- 225 Safety-block direct current (DC) power transfer connector
- 240 Leveling screw
- 250 Safety-block direct current (DC) voltage conversion device
- 270 Safety-block direct current (DC) battery charger
- 280 Safety-block direct current (DC) battery pack
- 300 Control module
- 302 Control-module rear
- 304 Control-module user interface
- 306 Control-module cavity
- 320 Control-module switch
- 322 Control-module transmitter
- 324 Control-module receiver
- 326 Remote receiver
- 328 Control-module thermostat
- 330 Control-module alternating current (AC) power outlet
- 335 Control-module alternating current (AC) power connector
- 340 Control-module direct current (DC) power outlet
- 345 Control-module direct current (DC) power connector
- 350 Radio frequency chip
- 360 Control-module intercomunit
- 370 Attaching screw mounting socket
- 400 Cover
- 402 Cover rear
- 404 Cover front
- 410 Cover alternating current (AC) light
- 420 Cover direct current (DC) light
- 430 Cover mounting hole
- 440 Cover attaching screw
- 450 Cover attaching screw light Overview.

Referring now to FIG. 1-5, the present invention features an electrical control system (100) for fixtures, devices and appliances consolidating multiple control points, and safely isolating a typical household power source, for promoting safety and facilitating energy conservation.

System—Safety Block.

In some embodiments, the system (100) has a safety block (200) with a safety-block rear (202), a safety-block front (204), a safety-block cavity (206), a safety-block alternating current (AC) power supply connector (210), and a safety-block alternating current (AC) power transfer connector (220). In some embodiments the safety-block AC power supply connector (210) is located on the safety-block rear (202) where the safety-block AC power supply connector (210) operatively attaches to an alternating current (AC) power supply (130) present in an electrical box (120). In some embodiments, the safety-block AC power supply connector (210) passes through the safety block (200) via the safety-block cavity (206). In some embodiments, the safety-block AC power transfer connector (220) is located on the safety-block front (204) where the safety-block AC power transfer connector (220) operatively attaches to the safety-block AC power supply connector (210). In some embodiments, the safety block (200) safely isolates household power (130) within the electrical box (120) once installed.

System—Control Module.

In some embodiments, the system (100) has a control module (300) with a control-module rear (302), a control-module user interface (304), a control-module cavity (306), and a control-module alternating current (AC) power connector (335). In some embodiments, the control-module AC power connector (335) is located on the control-module rear (302) where the control-module AC power connector (335) operatively connects to the safety-block AC power transfer connector (220) before installation of the control module (300) into the electrical box (120). In some embodiments, the control-module AC power connector (335) passes through the control module (300) via the control-module cavity (306). In some embodiments, the control-module user interface (304) operatively attaches to the control-module AC power connector (335).

System.

In some embodiments, power is transferred from the AC power supply (130), via the safety-block AC power supply connector (210), via the safety-block AC power transfer connector (220), via the control-module AC power connector (335), to the control-module user interface (304). In some embodiments, the electrical control system (100) for fixtures, devices and appliances safety isolates a typical household power source via the features of the safety block (200), and consolidates multiple control points to remotely activate a combination of fixtures, devices and appliances via the features of the control module (300), thereby promoting safety and facilitating energy conservation.

In some embodiments, household power is between 100V and 127V alternating current (AC) (130). In some embodiments, household power is within 6% of 230V alternating current (AC) (130).

In some embodiments, the system (100) uses mounting technology that is common to household power outlets and light switches. In some embodiments, the system (100) mounts to self-tapping, or threaded holes positioned on the electrical box (120). In some embodiments, the system (100) mounts to self-tapping, or threaded holes positioned on the front, top, center and the front, bottom, center of the electrical box (120).

In some embodiments, the system (100) utilizes existing electrical boxes (120) mounted inside a hollow wall of a building. In some embodiments, the system (100) utilizes existing electrical boxes (120) mounted on the surface of a wall of a building. In some embodiments, the system (100) utilizes a newly installed electrical box (120) mounted inside a hollow wall or on the surface of a wall of a building.

In some embodiments, the electrical box (120) is wider than a typical electrical box (120), for example about 8" or more. In some embodiments, the electrical box (120) is wider than a typical electrical box (120), for example about 7". In some embodiments, the electrical box (120) is wider than a typical electrical box (120), for example about 6". In some embodiments, the electrical box (120) is wider than a typical electrical box (120), for example about 5". In some embodiments, the electrical box (120) is wider than a typical electrical box (120), for example about 4".

In some embodiments, the electrical box (120) is taller than a typical electrical box (120), for example about 8" or more. In some embodiments, the electrical box (120) is taller than a typical electrical box (120), for example about 7". In some embodiments, the electrical box (120) is taller than a typical electrical box (120), for example about 6". In some embodiments, the electrical box (120) is taller than a typical electrical box (120), for example about 5". In some embodiments, the electrical box (120) is taller than a typical electrical box (120), for example about 4".

In some embodiments, the electrical box (120) contains an aperture to allow entry of the AC power supply (130) wire. In some embodiments, the electrical box (120) contains a plurality of apertures to allow entry of the AC supply (130) wire. In some embodiments, a plug is used to seal any unused apertures in the electrical box (120).

In some embodiments, an electrical box (120) is mounted about 60" from the floor. In some embodiments, an electrical box (120) is mounted about 54" from the floor. In some embodiments, an electrical box (120) is mounted about 48" from the floor. In some embodiments, an electrical box (120) is mounted about 42" from the floor. In some embodiments, an electrical box (120) is mounted about 36" from the floor.

In some embodiments, a room will have one electrical box (120). In some embodiments, a room will have a plurality of electrical boxes (120). In some embodiments, an electrical box (120) is used to house a light switch. In some embodiments, an electrical box (120) is used to house an electrical outlet. In some embodiments, an electrical box (120) is used to house a thermostat. In some embodiments, an electrical box (120) is used to house an intercomsystem. In some embodiments, an electrical box (120) is used to house a combination of devices.

In some embodiments, the AC power supply (130) is connected to the safety-block AC power supply connector (210) via twist-on wire connectors. In some embodiments, the AC power supply (130) is connected to the safety-block AC power supply connector (210) via a mated pair of male and female connectors. In some embodiments, the male connector is on the end of an extension wire. In some embodiments, the female connector is on the end of an extension wire. In some embodiments, the extension wire is about 4". In some embodiments, the extension wire is about 3". In some embodiments, the extension wire is about 2". In some embodiments, the extension wire is about 1".

In some embodiments, the safety-block AC power transfer connector (220) is connected to the control-module AC power connector (335) via a mated pair of male and female connectors. In some embodiments, the male connector is on the end of an extension wire. In some embodiments, the female connector is on the end of an extension wire. In some embodiments, the extension wire is about 4". In some embodiments, the extension wire is about 3". In some embodiments, the extension wire is about 2". In some embodiments, the extension wire is about 1".

Alternate Embodiment

Cover

Figure 1:
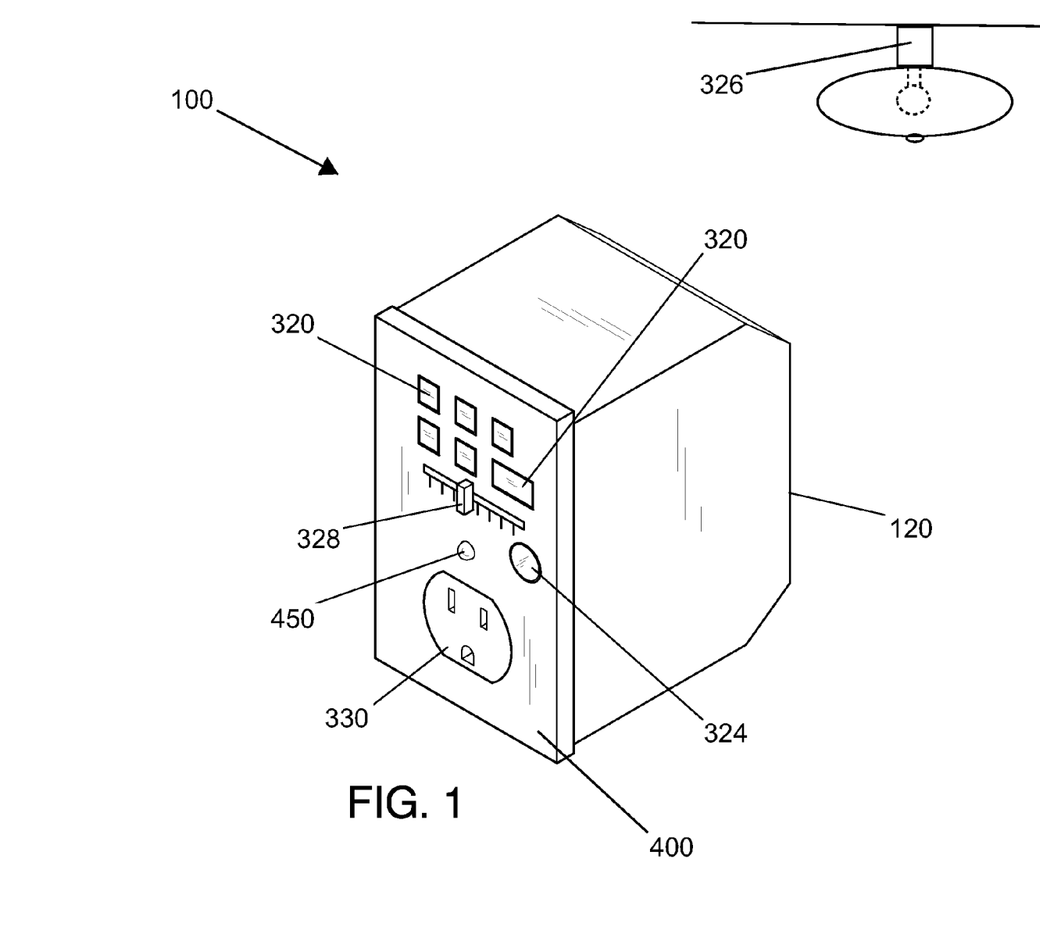
FIG. 1 is a perspective view of the control system of the present invention.
Figure 2:
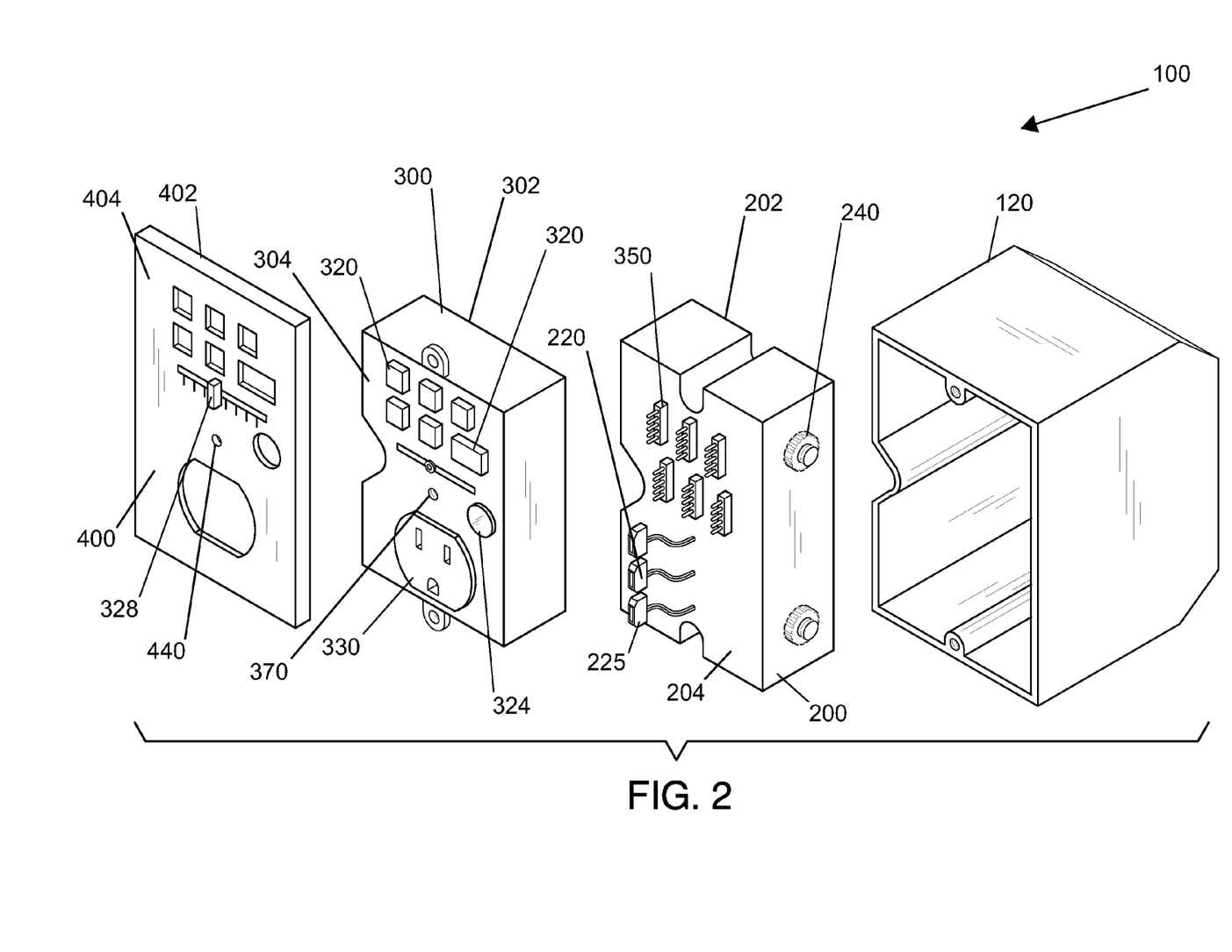
FIG. 2 is a view of the components of the control system of the present invention.
Figure 3:
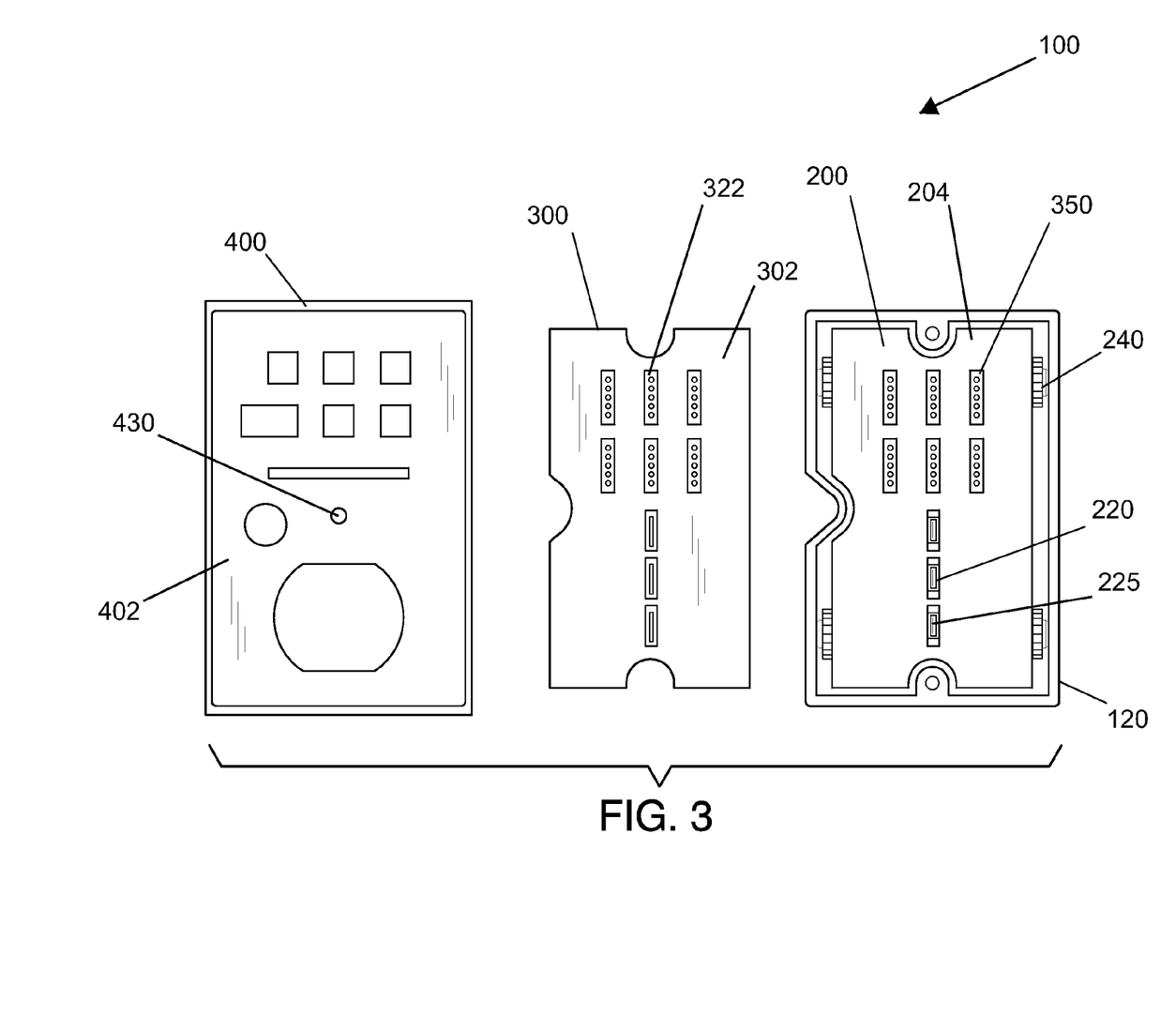
FIG. 3 is a back view and a front view of the components of the present invention.
Figure 4:
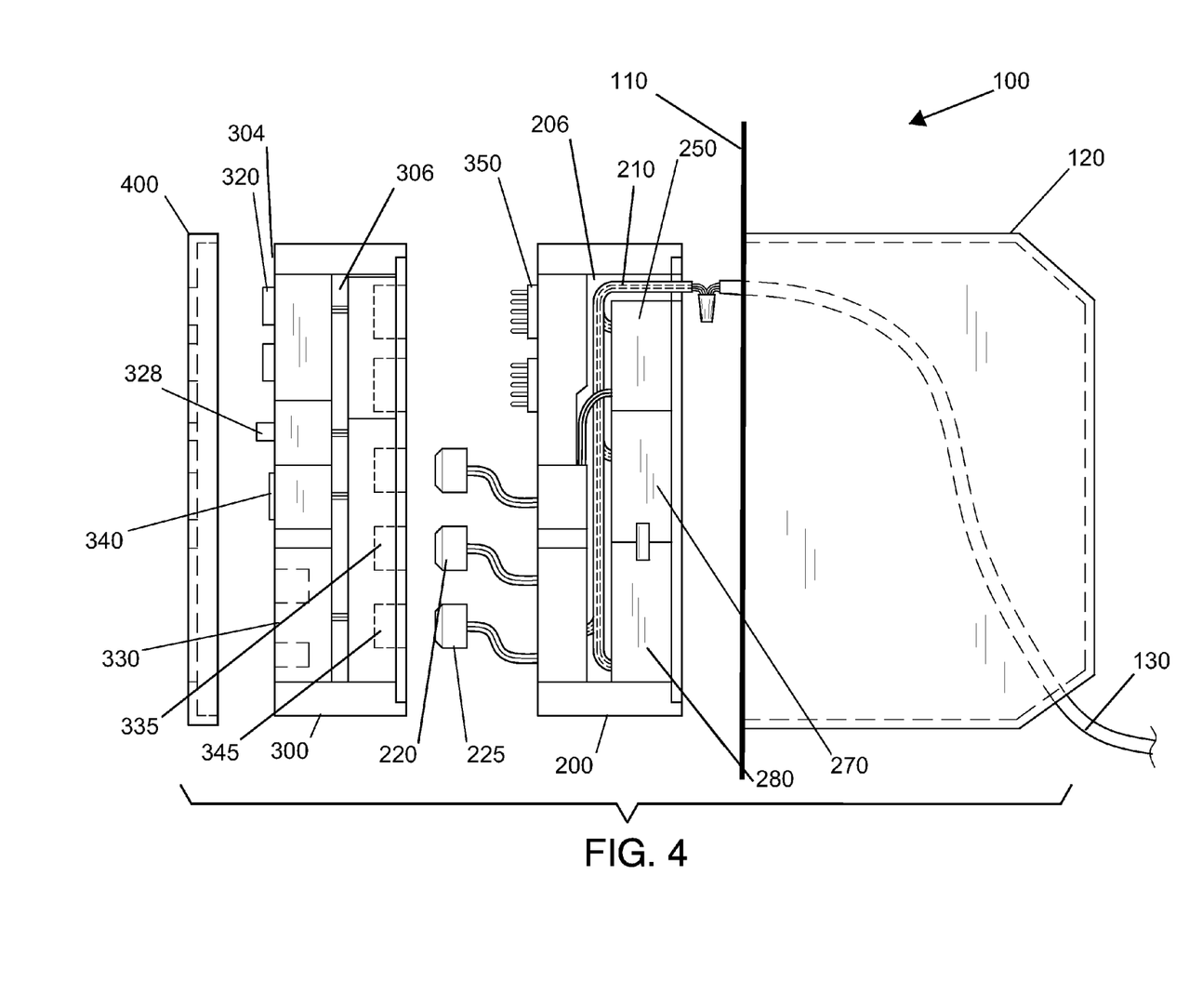
FIG. 4 is a cross-sectional view of the components of the present invention.
Figure 5:
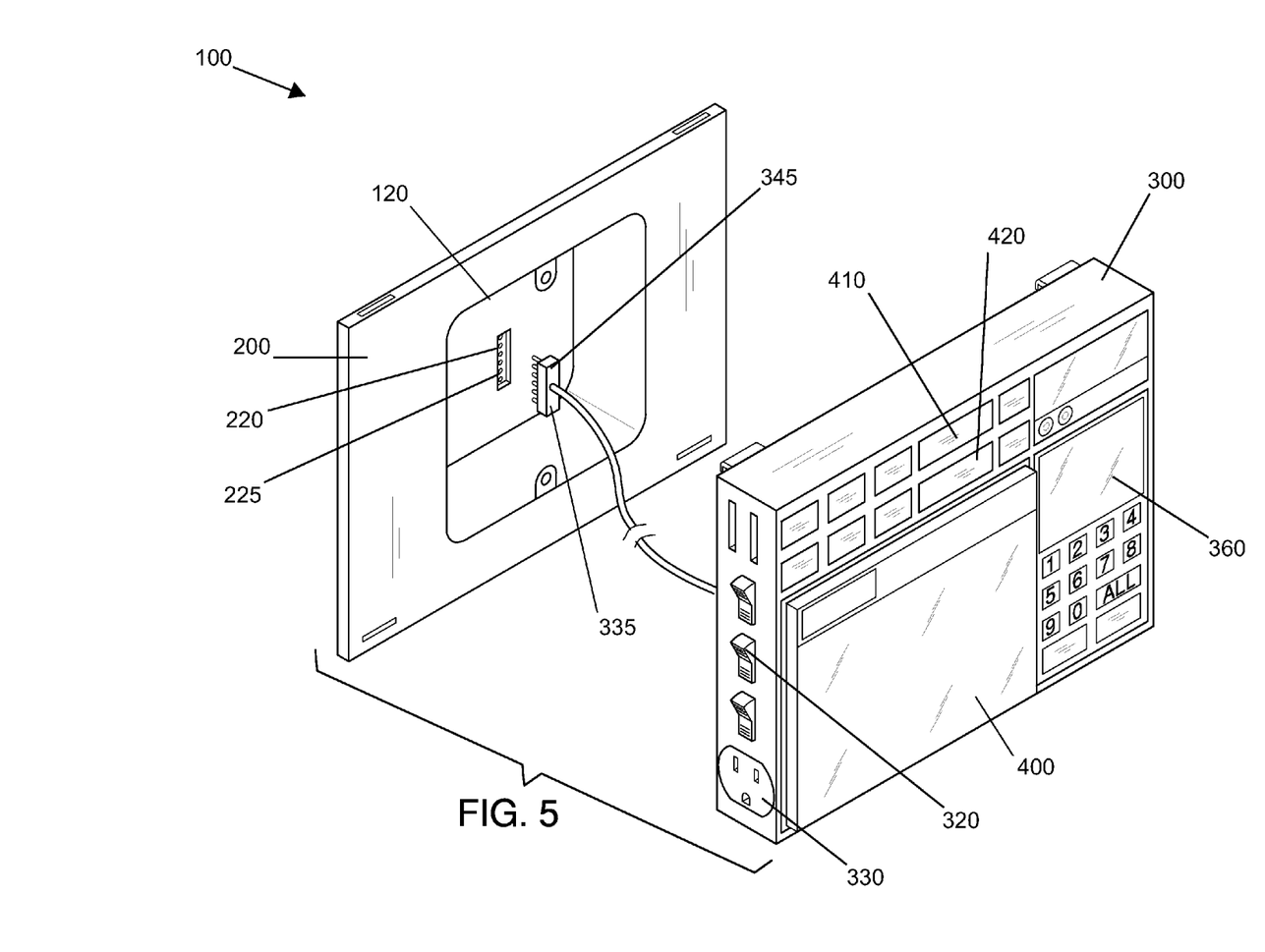
FIG. 5 is a perspective view of an alternate embodiment of the present invention.

In some embodiments, the system (100) has a cover (400). In some embodiments, the cover has a cover rear (402), and a cover front (404). In some embodiments the cover rear (402) interfaces with a mounting surface (110). In some embodiments, the cover front (404) faces outward, opposite the mounting surface (110). In some embodiments, the cover (400) has a phosphor material. In some embodiments, the cover (400) provides a fascia to hide unfinished edges around the electrical box (120).

In some embodiments, the cover (400) wholly covers the control module (300). In some embodiments, the cover (400) partially covers the control module (300). In some embodiments, the cover (400) is constructed from a transparent material. In some embodiments, the cover (400) is constructed from a translucent material. In some embodiments, the cover (400) is constructed from an opaque material. In some embodiments, the cover (400) is hinged. In some embodiments, the cover (400) is hinged at the bottom.

Alternate Embodiment

DC Voltage Conversion Device

In some embodiments, the safety block (200) has a safety-block direct current (DC) voltage conversion device (250) located inside, and a safety-block direct current (DC) power transfer connector (225) located on the safety-block front (204). In some embodiments, the safety-block AC power supply connector (210) passes through the safety block (200) via the safety-block cavity (206). In some embodiments, the safety-block AC power supply connector (210) is operatively attached to the safety-block DC voltage conversion device (250). In some embodiments, the DC voltage conversion device (250) is operatively attached to the safety-block DC power transfer connector (225). In some embodiments, the safety-block DC power transfer connector (225) passes through the safety block (200) via the safety-block cavity (206). In some embodiments, power is transferred from the AC power supply (130), via the safety-block AC power supply connector (210), via the safety-block DC voltage conversion device (250), to the safety-block DC power transfer connector (225).

In some embodiments, the DC voltage conversion device (250) is vented to minimize heat buildup within the safety block (200).

Alternate Embodiment

DC Battery Charger, DC Battery Pack

In some embodiments, the safety block (200) has a safety-block direct current (DC) battery charger (270), and a safety-block direct current (DC) battery pack (280) located inside, and a safety-block direct current (DC) power transfer connector (225) located on the safety-block front (204). In some embodiments, the safety-block AC power supply connector (210) passes through the safety block (200) via the safety-block cavity (206). In some embodiments, the safety-block DC battery charger (270) is operatively attached to the safety-block AC power supply connector (210). In some embodiments, the safety-block DC battery pack (280) is operatively attached to the safety-block direct current (DC) battery charger (270). In some embodiments, the safety-block DC power transfer connector (225) is operatively attached to the safety-block DC battery pack (280). In some embodiments, the safety-block DC power transfer connector (225) passes through the safety block (200) via the safety-block cavity (206). In some embodiments, operating power is transferred from the AC power supply (130), via the safety-block AC power supply connector (210), via the safety-block DC battery charger (270), via the safety-block DC battery pack (280), to the safety-block DC power transfer connector (225).

In some embodiments, the DC battery charger (270) can be operatively connected to a battery charging port on the control module (300). In some embodiments, the DC battery pack (280) provides a source of backup power in the event of an alternating current power outage.

In some embodiments, the DC battery charger (270) is vented to minimize heat buildup within the safety block (200).

Alternate Embodiment

DC Power Outlet

In some embodiments, the control module (300) has a control-module direct current (DC) power outlet (340) and a control-module direct current (DC) power connector (345) located on the control module (300). In some embodiments, the control-module DC power outlet (340) operatively attaches to the control-module DC power connector (345). In some embodiments, the control-module DC power connector (345) passes through the control module via the control-module cavity (306). In some embodiments, the control-module DC power connector (345) operatively attaches to the safety-block DC power transfer connector (225). In some embodiments, operating power is transferred from the AC power supply (130), via the safety-block AC power supply connector (210), via the safety-block DC voltage conversion device (250), via the safety-block DC power transfer connector (225), via the control-module DC power connector (345), to the control-module DC power outlet (340).

Alternate Embodiment

Leveling Screw

In some embodiments, the safety block (200) has a leveling screw (240) located on the safety block (200). In some embodiments, the leveling screw (240), adjustably affixes the safety block (200) into a static position inside a household electrical box (120). In some embodiments the safety block (200) has a plurality of leveling screws (240). In some embodiments, the leveling screw (240) is located on a side of the safety block (200).

In some embodiments, the control module (300) has a leveling screw (240). In some embodiments, the control module (300) has a plurality of leveling screws (240).

In some embodiments, the safety block (200) has an attachment clip. In some embodiments, the safety block (200) has a plurality of attachment clips. In some embodiments, the control module (300) has an attachment clip. In some embodiments, the control module (300) has a plurality of attachment clips. In some embodiments the attachment clip is a spring.

Alternate Embodiment

Switch

In some embodiments, the control module user interface (304) has a control-module switch (320) located the control module user interface (304). In some embodiments, the control-module switch (320) operatively attaches to the control-module AC power connector (335). In some embodiments the control module AC power connector (335) passes through the control module (300) via the control-module cavity (306). In some embodiments, the control-module switch (320) operatively attaches to a control-module transmitter (322) located in the control module (300). In some embodiments, the control-module switch (320) activates the control-module transmitter (322) to transmit a signal to a remote receiver (326) located in a fixture, device, or appliance. In some embodiments, upon receiving a signal from the control-module transmitter (322), the remote receiver (326) activates a fixture, device, or appliance. In some embodiments, operating power is transferred from the AC power supply (130), via the safety-block AC power supply connector (210), via the safety-block AC power transfer connector (220), via the control-module AC power connector (335), to the control-module switch (320) and the control-module transmitter (322).

In some embodiments, a plurality of control-module switches (320) is located on the control-module user interface (304). In some embodiments, a single control-module switch (320) is located on the control-module user interface (304). In some embodiments, two control-module switches (320) are located on the control-module user interface (304). In some embodiments, three control-module switches (320) are located on the control-module user interface (304). In some embodiments, four control-module switches (320) are located on the control-module user interface (304). In some embodiments, five control-module switches (320) are located on the control-module user interface (304). In some embodiments, six or more control-module switches (320) are located on the control-module user interface (304). In some embodiments, a corresponding control-module transmitter (322) is located in the control module (300) for each control-module switch (320).

In some embodiments, a top, left control-module switch (320) is used for a main ceiling light. In some embodiments, a top, right control-module switch (320) is used for closing or opening all heater vents in the room. In some embodiments, the top, left control-module switch (320) and the top, right control-module switch (320) are very close to each other, for example, ⅛". In some embodiments, a center, left control-module switch (320) is used for a table light switch. In some embodiments, a center, right control-module switch (320) is used for a table light switch. In some embodiments, a dimmer style control-module switch (320) is used for lighting.

In some embodiments a single control-module switch (320) is used to shut off power to all devices in the room. In some embodiments a single control-module switch (320) is used to close all heater vents in the room. In some embodiments, the single control-module switch (320) used to close and shut off power to all devices in the room is a round control-module switch (320) having an image of the earth.

In some embodiments, the control-module switch (320) turns off unused electrical outlets in a room as a safety measure for small children.

In some embodiments, the control-module switch (320) is used for testing a smoke alarm. In some embodiments, a top, right control-module switch (320) is used for testing a smoke alarm.

In some embodiments, the control-module switch (320) is a rectangular shape.

In some embodiments, the control-module switch (320) opens a heater vent in 25% increments. In some embodiments, the control-module switch (320) closes a heater vent in 25% increments. In some embodiments, the control-module switch (320) opens a heater vent in 10% increments. In some embodiments, the control-module switch (320) closes a heater vent in 10% increments. In some embodiments, the control-module switch (320) opens a heater vent in a 100% increment. In some embodiments, the control-module switch (320) closes a heater vent in a 100% increment. In some embodiments, the control-module switch (320) that opens a heater vent in increments is located in the center, left position of the control module user interface (304). In some embodiments, the control-module switch (320) that closes a heater vent in increments is located in the center, right position of the control-module user interface (304).

In some embodiments a pair of control-module switch (320) arrow keys proportionally opens or closes the heater vent in 10% increments. In some embodiments, a "hold" control-module switch (320) keeps the heater vent at a selected setting. In some embodiments, a set of control-module switch (320) keys are used for inputting data into the control-module user interface (304), for example, time, vent open time, vent close time, and the day of the week.

In some embodiments, a control-module switch (320) is a two-way dial used for incremental adjustments.

In some embodiments, three control-module switches (320) on the bottom of the control-module user interface (304) are used for table lights. In some embodiments, the control-module user interface (304) has three control-module switches (320) for heater vents. In some embodiments, the control-module user interface (304) has two control-module switches (320) for heater vents.

In some embodiments, the remote receiver (326) is the control-module receiver (324).

Alternate Embodiment

Radio Frequency Chip

In some embodiments, the control-module transmitter (322) has an interchangeable radio frequency chip (350) located in the control module (300). In some embodiments, the radio frequency chip (350) is operatively attached to the control-module transmitter (322). In some embodiments, the radio frequency chip (350) is a first component of a mated set. In some embodiments, a second radio frequency chip (350) is a second component of the mated set. In some embodiments, the second radio frequency chip (350) is located in the remote receiver (326). In some embodiments, the second radio frequency chip (350) is operatively attached to the remote receiver (326).

In some embodiments, the heater vent has two frequency chips (350). In some embodiments, frequency chips (350) are used to group electrical fixtures, devices and appliances for common activation from a control-module switch (320). In some embodiments, all devices have the same frequency chip (350). In some embodiments, each device has a unique frequency chip (350). In some embodiments, a device has more than one frequency chip (350).

Alternate Embodiment

Thermostat

In some embodiments, the control module user interface (304) has a control-module thermostat (328) located on the control module user interface (304). In some embodiments, the control-module thermostat (328) operatively attaches to the control-module AC power connector (335). In some embodiments, the control module AC power supply connector (335) passes through the control module (300) via the control-module cavity (306). In some embodiments, the control-module thermostat (328) operatively attaches to a control-module transmitter (322) located in the control module (300). In some embodiments, the control-module thermostat (328) activates the control-module transmitter (322) to transmit a signal to a remote receiver (326) located in a fixture, device, or appliance. In some embodiments, the remote receiver (326), upon receiving a signal from the control-module thermostat (328), activates a fixture, device, or appliance. In some embodiments, operating power is transferred from the AC power supply (130), via the safety-block AC power supply connector (210), via the safety-block AC power transfer connector (220), via the control-module AC power connector (335), to the control-module thermostat (328) and the control-module transmitter (322).

In some embodiments the control-module thermostat (328) controls a fan. In some embodiments the control-module thermostat (328) controls a heater. In some embodiments the control-module thermostat (328) controls an air conditioning system. In some embodiments the control-module thermostat (328) controls a power outlet.

Alternate Embodiment

Intercom Unit

In some embodiments, the control module user interface (304) has a control-module intercomunit (360) located thereon. In some embodiments, the control-module intercomunit (360) has a local audio receiving unit (microphone), a local audio transmitting unit (speaker), a control-module transmitter (322), and a control-module receiver (324). In some embodiments, the control-module intercomunit (360) operatively attaches to the control-module AC power connector (335). In some embodiments, the control module AC power supply connector (335) passes through the control module (300) via the control-module cavity (306). In some embodiments, the control-module intercomunit (360) operatively attaches to the control-module transmitter (322) located in the control module (300). In some embodiments, the control-module intercomunit (360) operatively attaches to the control-module receiver (324). In some embodiments, upon activation, a first control-module intercomunit (360) activates the control-module transmitter (322) to transmit a signal received from the local audio receiving unit to a second control-module intercom unit (360). In some embodiments, the second control-module intercomunit (360) receives the signal from the first control-module intercomunit (360) via the control-module receiver (324) and broadcasts the signal through the local audio transmitting unit. In some embodiments, operating power is transferred from the AC power supply (130), via the safety-block AC power supply connector (210), via the safety-block AC power transfer connector (220), via the control-module AC power connector (335), to the control-module intercomunit (360). In some embodiments, a plurality of control-module intercomunits (360) is paired.

In some embodiments, the control-module intercomunit (360) is a phone. In some embodiments, the control-module intercomunit (360) uses Voice over Internet Protocol (VoIP) technology.

Alternate Embodiment

AC Power Outlet

In some embodiments, the control module (300) has a control-module alternating current (AC) power outlet (330) located on the control-module user interface (304). In some embodiments, the control-module AC power outlet (330) operatively attaches to the control-module AC power connector (335). In some embodiments, the control-module alternating current (AC) power supply connector (335) passes through the control module (300) via the control-module cavity (306). In some embodiments, operating power is transferred from the AC power supply (130), via the safety-block AC power supply connector (210), via the safety-block AC power transfer connector (220), via the control-module AC power connector (335), to the control-module AC power outlet (330).

Alternate Embodiment

Cover AC Light

In some embodiments, the cover (400) has a cover alternating current (AC) light (410). In some embodiments, the cover AC light (410) operatively interfaces with the control-module AC power connector (335). In some embodiments, the control-module AC power connector (335) passes through the control module (300) via the control-module cavity (306). In some embodiments, the control-module AC power connector (335) operatively attaches to the safety-block AC power transfer connector (220). In some embodiments, operating power is transferred from the AC power supply (130), via the safety-block AC power supply connector (210), via the safety-block AC power transfer connector (220), via the control-module AC power connector (335), to the cover AC light (410).

Alternate Embodiment

Cover DC Light

In some embodiments, the system (100) has a cover (400) with a cover rear (402), and a cover front (404). In some embodiments, the cover rear (402) interfaces with a mounting surface (110). In some embodiments, the cover front (404) faces outward, opposite the mounting surface (110). In some embodiments, the cover has a cover direct current (DC) light (420). In some embodiments, the cover DC light (420) operatively attaches to the control-module DC power connector (345). In some embodiments, the control-module DC power connector (345) passes through the control module (300) via the control-module cavity (306). In some embodiments, the control-module DC power connector (345) operatively attaches to the safety-block DC power transfer connector (225). In some embodiments, operating power is transferred from the AC power supply (130), via the safety-block AC power supply connector (210), via the safety-block DC voltage conversion device (250), via the safety-block DC power transfer connector (225), via the control-module DC power connector (345), to the cover DC light (420).

In some embodiments, the cover DC light (420) is detachable.

Alternate Embodiment

Cover Attaching Screw

In some embodiments, the cover (400) has a cover mounting hole (430). In some embodiments, the control module (300) has an attaching screw mounting socket (370) comprising threads. In some embodiments, the cover mounting hole (430) and attaching screw mounting socket (370) are sized to receive a cover attaching screw (440) with threads that match the attaching screw mounting socket (370). In some embodiments, the cover attaching screw (440) passes through the cover mounting hole (430) and attaches to the attaching screw mounting socket (370). In some embodiments, the cover (400) is held into a static position with respect to the mounting surface (110).

Alternate Embodiment

Attaching Screw Light

In some embodiments, the system (100) has a cover (400) with a cover rear (402), and a cover front (404). In some embodiments, the cover rear (402) interfaces with a mounting surface (110). In some embodiments, the cover front (404) faces outward, opposite the mounting surface (110). In some embodiments, the cover has a cover mounting hole (430). In some embodiments, the control module (300) has an attaching screw mounting socket (370). In some embodiments, the cover mounting hole (430) and attaching screw mounting socket (370) are sized to receive a cover attaching screw (440). In some embodiments, the cover attaching screw (440) passes through the cover mounting hole (430) and attaches to the attaching screw mounting socket (370). In some embodiments, the cover attaching screw (440) has a cover attaching screw light (450). In some embodiments, the cover attaching screw light (450) is operatively attached to the attaching screw mounting socket (370). In some embodiments, the attaching screw mounting socket (370) is operatively attached to the control-module DC power connector (345). In some embodiments, the control-module DC power connector (345) passes through the control module (300) via the control-module cavity (306). In some embodiments, the control-module DC power connector (345) operatively attaches to the safety-block DC power transfer connector (225). In some embodiments, the cover (400) is held into a static position with respect to the mounting surface (110). In some embodiments, operating power is transferred from the AC power supply (130), via the safety-block AC power supply connector (210), via the safety-block DC voltage conversion device (250), via the safety-block DC power transfer connector (225), via the control-module DC power connector (345), via the attaching screw mounting socket (370), to the cover attaching screw light (450).

In some embodiments, the control module (300) has a microprocessor. In some embodiments, the control module (300) has a human machine interface. In some embodiments, the control module has a primary logic controller. In some embodiments, the control module can be programmed receive input signals, then output signals based on the input signals, for example, upon detecting motion near the motion sensor, output a signal to activate a light for a time period of 60 second, then deactivate the light. In some embodiments, the control module (300) has a microprocessor that contains a control-module user interface (304) and a combination of components selected from a group consisting of: a control-module switch (320), and a control-module thermostat (328).

Alternate Embodiment

User Interface Inputs

In some embodiments, the control-module user interface (304) has alphanumeric character input keys. In some embodiments, the alphanumeric character input keys are a plurality of control-module switches (320). In some embodiments, the control-module user interface (304) has a plurality of arrow input keys that activate an item on a corresponding menu from a display. In some embodiments, the control-module user interface (304) has a video input device, for example a video camera. In some embodiments, the control-module user interface (304) has a temperature sensor, for example a thermocouple or a resistance temperature detector (RTD). In some embodiments, the control-module user interface (304) has a photoelectric sensor, for example, a sensor used for detection of a person. In some embodiments, the control-module user interface (304) has a photovoltaic sensor, for example for charging a battery. In some embodiments, the control-module user interface (304) has a passive infrared sensor, for example, a sensor for detection of a person. In some embodiments, the control-module user interface (304) has an ultrasonic sensor, for example, for detection of a person. In some embodiments, the control-module user interface (304) has a universal serial bus (USB) port, for example, for data input. In some embodiments, the control-module user interface (304) has an infrared signal receiver, for example, to receive data input from a remote control unit.

Alternate Embodiment

User Interface Outputs

In some embodiments, the control-module user interface (304) has an output text display screen. In some embodiments, the control-module user interface (304) has an output video display screen. In some embodiments, the control-module user interface (304) has a light for illumination. In some embodiments, the control-module user interface (304) has a plurality of lights for illumination. In some embodiments, the control-module user interface (304) has a light for status indication. In some embodiments, the control-module user interface (304) has a plurality of lights for status indication.

In some embodiments, a series of "modes" provide enhanced functionality for the control-module user interface (304), for example, a calendar displayed on the control-module user interface (304), a nightlight on the control-module user interface (304), a picture displayed on the control-module user interface (304), an alarm clock displayed on and controlled by the control-module user interface (304), an operational timer for controlling automatic light and heater vents displayed on and controlled by the control-module user interface (304), an intercom controlled by the control-module user interface (304), an internet phone controlled by the control-module user interface (304), a electronic phone book displayed on and controlled by the control-module user interface (304), network settings displayed on and controlled by the control-module user interface (304), a control-module thermostat (328) displayed on and controlled by the control-module user interface (304).

Alternate Embodiment

Wireless 3G/4G

In some embodiments, the control-module user interface (304) uses 3rd generation mobile telecommunications (3G), or 4th generation mobile telecommunications (4G) technology to transmit and receive high speed radio signals using spread spectrum radio transmission technology to activate a remote receiver (326) or a control-module receiver (324). In some embodiments, control-module user interface (304) functionality is controlled by a program or an application on a cellular phone, tablet or a home computer.

Alternate Embodiment

Bluetooth®

In some embodiments, the control-module user interface (304) uses BLUETOOTH® Technology to transmit and receive radio signals over a personal area network (PAN) for a distance of up to 164 feet to activate a remote receiver (326) or a control-module receiver (324). In some embodiments, control-module user interface (304) functionality is controlled by a program or an application on a cellular phone, tablet or a home computer.

Alternate Embodiment

WiFi

In some embodiments, the control-module user interface (304) uses WiFi (IEEE 802.11) technology to transmit and receive radio signals to activate a remote receiver (326) or a control-module receiver (324). In some embodiments, control-module user interface (304) functionality is controlled by a program or an application on a cellular phone, tablet or a home computer.

Alternate Embodiment

Ethernet/PoE

In some embodiments, the control module user interface (304) is connected by an Ethernet cable (RJ45 connectors on a cat 5 cable) to a local area network (LAN) to activate a remote receiver (326) and a control-module receiver (324). In some embodiments, control-module user interface (304) functionality is controlled by a program or an application on a cellular phone, tablet or a home computer. In some embodiments, the control module user interface (304) uses Power over Ethernet (PoE) technology to transfer data and power to a remote receiver (326) or a control-module receiver (324).

As used herein, the term "about" refers to plus or minus 10% of the referenced number. For example, an embodiment wherein the device is about 10 inches in length includes a device that is between 9 and 11 inches in length.

The disclosures of the following U.S. patents are incorporated in their entirety by reference herein: U.S. Pat. No. 5,458,311; U.S. Pat. No. 6,120,262; U.S. Pat. No. 6,630,800; U.S. Pat. No. 7,656,308; U.S. Pat. No. 7,715,441; U.S. Pat. No. 7,982,434; U.S. Pat. Publication No. 2007/0195526; U.S. Pat. Publication No. 2008/0258675.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

The reference numbers recited in the below claims are solely for ease of examination of this patent application, and are exemplary, and are not intended in any way to limit the scope of the claims to the particular features having the corresponding reference numbers in the drawings.

What is claimed is:

1. An electrical control system for fixtures, devices and appliances consolidating multiple control points, and safely isolating a typical household power source, for promoting safety and facilitating energy conservation, said system comprising:
(a) a safety block comprising a safety-block rear, a safety-block front, a safety-block cavity, a safety-block alternating current power supply connector, and a safety-block alternating current power transfer connector, wherein said safety-block rear comprises the safety-block AC power supply connector disposed thereon, wherein said safety-block AC power supply connector operatively attaches to an alternating current (AC) power supply, wherein said safety-block AC power supply connector passes through the safety block via the safety-block cavity, wherein said safety-block front comprises a safety-block AC power transfer connector disposed thereon, wherein said safety-block AC power transfer connector operatively attaches to the safety-block AC power supply connector, wherein the safety block further comprises a plurality leveling screws disposed on each side thereon, said leveling screws, adjustably affix the safety block into a static, level position inside a household electrical box; and
(b) a control module comprising a control-module rear, a control-module user interface, a control-module cavity, and a control-module alternating current (AC) power connector;
wherein said control-module rear comprises the control-module AC power connector disposed thereon, wherein said control-module AC power connector operatively connects to the safety-block AC power transfer connector, wherein said control-module AC power connector passes through the control module via the control-module cavity, wherein said control-module user interface operatively attaches to the control-module AC power connector,
wherein, the electrical control system for fixtures, devices and appliances safety isolates a typical household power source via the features of the safety block, and consolidates multiple control points to remotely activate a combination of fixtures, devices and appliances via the features of the control module, thereby promoting safety and facilitating energy conservation.

2. The system of claim 1, wherein the system further comprises a cover, said cover comprising a cover rear, and a cover front, wherein said cover rear interfaces with a mounting surface, said cover front faces outward, opposite the mounting surface.

3. The system of claim 2, wherein said cover further comprises a cover alternating current (AC) light, wherein said cover AC light operatively interfaces with said control-module AC power connector, wherein said control-module AC power connector passes through the control module via the control-module cavity, wherein said control-module AC power connector operatively attaches to the safety-block AC power transfer connector.

4. The system of claim 2, wherein the cover further comprises a cover mounting hole, wherein said control module further comprises an attaching screw mounting socket, said cover mounting hole and attaching screw mounting socket are sized to receive a cover attaching screw, wherein said cover attaching screw passes through the cover mounting hole and attaches to the attaching screw mounting socket, wherein the cover is held into a static position with respect to the mounting surface.

5. The system of claim 1, wherein the safety block further comprises a safety-block direct current (DC) voltage conversion device disposed therein, and a safety-block direct current (DC) power transfer connector disposed on the safety-block front, wherein said safety-block AC power supply connector passes through the safety block via the safety-block cavity, wherein said safety-block AC power supply connector is operatively attached to the safety-block DC voltage conversion device, wherein the DC voltage conversion device is operatively attached to the safety-block DC power transfer connector, wherein said safety-block DC power transfer connector passes through the safety block via the safety-block cavity.

6. The system of claim 5, wherein the control module further comprises a control-module direct current (DC) power outlet and a control-module direct current (DC) power connector disposed thereon,
wherein said control-module DC power outlet operatively attaches to the control-module DC power connector, wherein said control-module DC power connector passes through the control module via the control-module cavity, wherein said control-module DC power connector operatively attaches to the safety-block DC power transfer connector.

7. The system of claim 6, wherein said system further comprises a cover, said cover comprising a cover rear, and a cover front, wherein said cover rear interfaces with a mounting surface, said cover front faces outward, opposite the mounting surface, wherein said cover further comprises a cover direct current (DC) light, wherein said cover DC light operatively attaches to said control-module DC power connector, wherein said control-module DC power connector passes through the control module via the control-module cavity, wherein said control-module DC power connector operatively attaches to the safety-block DC power transfer connector.

8. The system of claim 7, wherein said system further comprises a cover, said cover comprising a cover rear, and a cover front, wherein said cover rear interfaces with a mounting surface, said cover front faces outward, opposite the mounting surface, wherein said cover further comprises a cover mounting hole, wherein said control module further comprises an attaching screw mounting socket, said cover mounting hole and attaching screw mounting socket are sized to receive a cover attaching screw, wherein said cover attaching screw passes through the cover mounting hole and attaches to the attaching screw mounting socket, wherein the cover attaching screw comprises a cover attaching screw light, wherein the cover attaching screw light is operatively attached to the attaching screw mounting socket, wherein the attaching screw mounting socket is operatively attached to said control-module DC power connector, wherein said control-module DC power connector passes through the control module via the control-module cavity, wherein said control-module DC power connector operatively attaches to the safety-block DC power transfer connector, wherein the cover is held into a static position with respect to the mounting surface.

9. The system of claim 1, wherein the safety block further comprises a safety-block direct current (DC) battery charger, and a safety-block direct current (DC) battery pack disposed therein, and a safety-block direct current (DC) power transfer connector disposed on the safety-block front, wherein said safety-block AC power supply connector passes through the safety block via the safety-block cavity, wherein said safety-block DC battery charger is operatively attached to the safety-block AC power supply connector, wherein said safety-block DC battery pack is operatively attached to the safety-block direct current (DC) battery charger, wherein said safety-block DC power transfer connector is operatively attached to the safety-block DC battery pack, wherein said safety-block DC power transfer connector passes through the safety block via the safety-block cavity.

10. The system of claim 1, wherein the control module user interface further comprises a control-module switch disposed thereon, wherein said control-module switch operatively attaches to the control-module AC power connector, wherein said control module AC power connector passes through the control module via the control-module cavity, wherein said control-module switch operatively attaches to a control-module transmitter disposed in the control module, wherein said control-module switch activates the control-module transmitter to transmit a signal to a remote receiver disposed in a fixture, device, or appliance, wherein said remote receiver, upon receiving a signal from the control-module transmitter, activates a fixture, device, or appliance.

11. The system of claim wherein the control-module transmitter comprises an interchangeable radio frequency chip disposed in the control module, wherein the radio frequency chip is operatively attached to the control-module transmitter, wherein said radio frequency chip is a first component of a mated set, wherein a second radio frequency chip is a second component of the mated set, wherein the second radio frequency chip is disposed in the remote receiver, wherein the second radio frequency chip is operatively attached to the remote receiver.

12. The system of claim 1, wherein the control module user interface further comprises a control-module thermostat disposed thereon, wherein said control-module thermostat operatively attaches to the control-module AC power connector, wherein said control module AC power supply connector passes through the control module via the control-module cavity, wherein said control-module thermostat operatively attaches to a control-module transmitter disposed in the control module, wherein said control-module thermostat activates the control-module transmitter to transmit a signal to a remote receiver disposed in a fixture, device, or appliance, wherein said remote receiver, upon receiving a signal from the control-module thermostat, activates a fixture, device, or appliance.

13. The system of claim wherein the control-module transmitter comprises an interchangeable radio frequency chip disposed in the control module, wherein the radio frequency chip is operatively attached to the control-module transmitter, wherein said radio frequency chip is a first component of a mated set, wherein a second radio frequency chip is a second component of the mated set, wherein the second radio frequency chip is disposed in the remote receiver, wherein the second radio frequency chip is operatively attached to the remote receiver.

14. The system of claim 1, wherein the control module user interface further comprises a control-module intercom unit disposed thereon, wherein said control-module intercom unit comprises a local audio receiving unit, a local audio transmitting unit (speaker), a control-module transmitter, and a control-module receiver, wherein said control-module intercom unit operatively attaches to the control-module AC power connector, wherein said control module AC power supply connector passes through the control module via the control-module cavity, wherein said control-module intercom unit operatively attaches to the control-module transmitter disposed in the control module, wherein said control-module intercom unit operatively attaches to the control-module receiver, wherein upon activation, a first control-module intercom unit activates the control-module transmitter to transmit a signal received from the local audio receiving unit to a second control-module intercom unit, wherein the second control-module intercom unit receives the signal from the first control-module intercom unit via the control-module receiver and broadcasts the signal through the local audio transmitting unit.

15. The system of claim 1, wherein the control module further comprises a control-module alternating current (AC) power outlet disposed on the control-module user interface, wherein said control-module AC power outlet operatively attaches to the control-module AC power connector, wherein said control-module alternating current (AC) power supply connector passes through the control module via the control-module cavity.

16. An electrical control system for fixtures, devices and appliances consolidating multiple control points, and safely isolating a typical household power source, for promoting safety and facilitating energy conservation, said system consisting of:
    (a) a safety block consisting of a safety-block rear, a safety-block front, a safety-block cavity, a safety-block alternating current (AC) power supply connector, and a safety-block alternating current (AC) power transfer connector,
wherein said safety-block rear consists of the safety-block AC power supply connector, disposed thereon, wherein said safety-block AC power supply connector operatively attaches to an alternating current (AC) power supply, wherein said safety-block AC power supply connector passes through the safety block via the safety-block cavity, wherein said safety-block front consists of a safety-block AC power transfer connector disposed thereon, wherein said safety-block AC power transfer connector operatively attaches to the safety-block AC power supply connector, wherein the safety block further consists of a plurality leveling screws disposed on each side thereon, said leveling screws, adjustably affix the safety block into a static, level position inside a household electrical box; and
    (b) a control module consisting of a control-module rear, a control-module user interface, a control-module cavity, and a control-module alternating current (AC) power connector;
wherein said control-module rear consists of the control-module AC power connector disposed thereon, wherein said control-module AC power connector operatively connects to the safety-block AC power transfer connector, wherein said control-module AC power connector passes through the control module via the control-module cavity, wherein said control-module user interface operatively attaches to the control-module AC power connector, wherein, the electrical control system for fixtures, devices and appliances safety isolates a typical household power source via the features of the safety block, and consolidates multiple control points to remotely activate a combination of fixtures, devices and appliances via the features of the control module, thereby promoting safety and facilitating energy conservation.

17. An electrical control system for fixtures, devices and appliances consolidating multiple control points, and safely isolating a typical household power source, for promoting safety and facilitating energy conservation, said system consisting of:
    (a) a safety block consisting of a safety-block rear, a safety-block front, a safety-block cavity, a safety-block alternating current (AC) power supply connector, and a safety-block alternating current (AC) power transfer connector,
wherein said safety-block rear consists of the safety-block AC power supply connector disposed thereon, wherein said safety-block AC power supply connector operatively attaches to an alternating current (AC) power supply, wherein said safety-block AC power supply connector passes through the safety block via the safety-block cavity, wherein said safety-block front consists of the safety-block AC power transfer connector disposed thereon, wherein said safety-block AC power transfer connector operatively attaches to the safety-block AC power supply connector, wherein the safety block further consists of a plurality leveling screws disposed on each side thereon, said leveling screws, adjustably affix the safety block into a static, level position inside a household electrical box;
wherein the safety block further consists of a safety-block direct current (DC) voltage conversion device disposed therein, and a first safety-block direct current (DC) power transfer connector disposed on the safety-block front, wherein said safety-block AC power supply connector is operatively attached to the safety-block DC voltage conversion device, wherein the DC voltage conversion device is operatively attached to the first safety-block DC power transfer connector,
wherein the safety block further consists of a safety-block direct current (DC) battery charger, and a safety-block direct current (DC) battery pack disposed therein, and a second safety-block direct current (DC) power transfer connector disposed on the safety-block front, wherein said safety-block DC battery charger is operatively attached to the safety-block AC power supply connector, wherein said safety-block DC battery pack is operatively attached to the safety-block direct current (DC) battery charger, wherein said second safety-block DC power transfer connector is operatively attached to the safety-block DC battery pack;
    (b) a control module consisting of a control-module rear, a control-module user interface, a control-module cavity, and a control-module alternating current (AC) power connector;
wherein said control-module rear consists of the control-module AC power connector disposed thereon, wherein said control-module AC power connector operatively connects to the safety-block AC power transfer connector, wherein said control-module AC power connector passes through the control module via the control-module cavity, wherein said control-module user interface operatively attaches to the control-module AC power connector, wherein the control module further consists of a control-module direct current (DC) power outlet and a control-module direct current (DC) power connector disposed thereon, wherein said control-module DC power outlet operatively attaches to the control-module DC power connector, wherein said control-module DC power connector passes through the control module via the control-module cavity, wherein said control-module DC power connector operatively attaches to the safety-block DC power transfer connector;

wherein the control module user interface further consists of a control-module switch disposed thereon, wherein said control-module switch operatively attaches to the control-module AC power connector, wherein said control module AC power connector passes through the control module via the control-module cavity, wherein said control-module switch operatively attaches to a control-module transmitter disposed in the control module, wherein said control-module switch activates the control-module transmitter to transmit a signal to a remote receiver disposed in a fixture, device, or appliance, wherein said remote receiver, upon receiving a signal from the control-module transmitter, activates a fixture, device, or appliance;

wherein the control-module transmitter consists of an interchangeable radio frequency chip disposed in the control module, wherein the radio frequency chip is operatively attached to the control-module transmitter, wherein said radio frequency chip is a first component of a mated set, wherein a second radio frequency chip is a second component of the mated set, wherein the second radio frequency chip is disposed in the remote receiver, wherein the second radio frequency chip is operatively attached to the remote receiver;

wherein the control module user interface further consists of a control-module thermostat disposed thereon, wherein said control-module thermostat operatively attaches to the control-module AC power connector, wherein said control module AC power supply connector passes through the control module via the control-module cavity, wherein said control-module thermostat operatively attaches to a control-module transmitter disposed in the control module, wherein said control-module thermostat activates the control-module transmitter to transmit a signal to a remote receiver disposed in a fixture, device, or appliance, wherein said remote receiver, upon receiving a signal from the control-module thermostat, activates a fixture, device, or appliance;

wherein the control module user interface further consists of a control-module intercom unit disposed thereon, wherein said control-module intercom unit consists of a local audio receiving unit (microphone), a local audio transmitting unit (speaker), a control-module transmitter, and a control-module receiver, wherein said control-module intercom unit operatively attaches to the control-module AC power connector, wherein said control module AC power supply connector passes through the control module via the control-module cavity, wherein said control-module intercom unit operatively attaches to the control-module transmitter disposed in the control module, wherein said control-module intercom unit operatively attaches to the control-module receiver, wherein upon activation, a first control-module intercom unit activates the control-module transmitter to transmit a signal received from the local audio receiving unit to a second control-module intercom unit, wherein the second control-module intercom unit receives the signal from the first control-module intercom unit via the control-module receiver and broadcasts the signal through the local audio transmitting unit, wherein the control module further consists of a control-module alternating current (AC) power outlet disposed on the control-module user interface, wherein said control-module AC power outlet operatively attaches to the control-module AC power connector, wherein said control-module alternating current (AC) power supply connector passes through the control module via the control-module cavity; and (c) a cover, said cover consisting of a cover rear, and a cover front, wherein said cover rear interfaces with a mounting surface, said cover front faces outward, opposite the mounting surface;

wherein, the electrical control system for fixtures, devices and appliances safety isolates a typical household power source via the features of the safety block, and consolidates multiple control points to remotely activate a combination of fixtures, devices and appliances via the features of the control module, thereby promoting safety and facilitating energy conservation.

18. The system of claim 17, wherein said cover further consists of a cover alternating current (AC) light, wherein said cover AC light operatively interfaces with said control-module AC power connector, wherein said control-module AC power connector passes through the control module via the control-module cavity, wherein said control-module AC power connector operatively attaches to the safety-block AC power transfer connector, wherein the cover further consists of a cover mounting hole, wherein said control module further consists of an attaching screw mounting socket, said cover mounting hole and attaching screw mounting socket are sized to receive a cover attaching screw, wherein said cover attaching screw passes through the cover mounting hole and attaches to the attaching screw mounting socket, wherein the cover is held into a static position with respect to the mounting surface.

19. The system of claim 17, wherein said system further consists of a cover, said cover consisting of a cover rear, and a cover front, wherein said cover rear interfaces with a mounting surface, said cover front faces outward, opposite the mounting surface, wherein said cover further consists of a cover direct current (DC) light, wherein said cover DC light operatively attaches to said control-module DC power connector, wherein said control-module DC power connector passes through the control module via the control-module cavity, wherein said control-module DC power connector operatively attaches to the safety-block DC power transfer connector.

* * * * *